UNITED STATES PATENT OFFICE.

HENRY A. KOHMAN, OF PITTSBURGH, PENNSYLVANIA, CHARLES HOFFMAN, OF NEW YORK, N. Y., AND TRUMAN M. GODFREY, OF PITTSBURGH, PENNSYLVANIA.

MINERAL WATER FOR USE IN THE MANUFACTURE OF LEAVENED BREAD.

1,213,210.  Specification of Letters Patent.  Patented Jan. 23, 1917.

No Drawing.  Application filed June 8, 1916.  Serial No. 102,389.

*To all whom it may concern:*

Be it known that we, HENRY A. KOHMAN, CHARLES HOFFMAN, and TRUMAN M. GODFREY, all citizens of the United States, residing, respectively, in Pittsburgh, Allegheny county, State of Pennsylvania, New York, Bronx county, State of New York, and Pittsburgh, Allegheny county, State of Pennsylvania, have invented certain new and useful Improvements in Mineral Water for Use in the Manufacture of Leavened Bread; and we do hereby declare the following to be a full, clear, and exact description of the invention, such as will enable others skilled in the art to which it appertains to make and use the same.

In the manufacture of bread, it is important to obtain standard conditions for the several ingredients of the dough batch, in order that there may be no variation in the uniform excellence and purity of the finished loaf. This is particularly important with respect to the water employed in the making of leavened bread, inasmuch as, in different localities, the composition of the water varies with respect to the mineral constituents present therein in a soluble form. Thus, in some localities, where lime, for instance, is present in the bed of the stream over which the water flows, an amount of lime beyond the average goes into solution in the water and the water is commonly known as "hard". In other localities, where lime is less freely distributed, or where other conditions prevail, the percentage of lime taken up in solution by the water is but moderate, and the absence of any large percentage of lime is made manifest in the change in character of the water which is, in such case, commonly known as "soft". So also, the presence or absence of other mineral constituents in the water varies with the source from which it is obtained.

The purpose of the present invention is to supply to the trade, in easily available form, a mineral water containing in solution, certain salts, which have been found to be of great utility in the manufacture of leavened bread, permitting the amount of yeast ordinarily required for bread manufacture to be greatly lessened and permitting a lesser amount of sugar to be used than is ordinarily considered desirable.

In making up the mineral water constituting the subject-matter of the present invention, we bring into solution therein, certain relative proportions of salts which, when the solution is finally added to the large quantity of water used in the making up of the dough batch, are in such minute proportion that, as is the case with any supply of ordinary water, careful chemical analysis would be required to show that they are present.

The salts that we thus introduce in minute quantity in making up the mineral water constituting the yeast stimulant consist of ammonium chlorid, calcium chlorid, and potassium bromate. These salts being soluble in water may be added to distilled water in the following relative proportions: In five pounds of distilled water is dissolved one pound of ammonium chlorid, two pounds of calcium chlorid and one-fiftieth of a pound of potassium bromate. These ingredients dissolve freely in the distilled water. The resulting mineral water, yeast food, or yeast stimulant is then readily available for use in making up the dough batch. In practice, it requires approximately sixty pounds of water for 100 pounds of flour in the manufacture of leavened bread; but somewhat different amounts of water are required with different flours and for making different types of bread, this amount of water varying in practice from about 55 to about 63 pounds to 100 pounds of flour. In using the mineral water, yeast food, or yeast stimulant of the present invention, the dough batch is compounded in the usual manner of say 100 pounds of flour to the other ingredients employed in the manufacture of leavened bread, except that for the water ordinarily employed there is substituted a like quantity of water containing suitable amounts of the salts above specified. The solution above referred to is relatively concentrated, but it is of such a strength that it can be conveniently weighed in practice, while it is also sufficiently concentrated that it does not involve the handling of large amounts of water and excessive transportation charges in its distribution and use. In practice, about eight ounces of the concentrated solution above specified is used for each 100 pounds of flour. Accordingly, if eight ounces of this solution are added to sixty pounds of water, or the necessary amount of water for a dough batch of 100 pounds of flour, the desired amount of the salts will be furnished for the dough batch. It will, however, be understood that solution of greater or less concentration or dilution can be made and used, so long as the solution contains the desired salts in appropriate proportions. The invention accordingly contemplates and includes mineral waters of different concentrations varying from those which are available for use directly in place of the water ordinarily employed to the more concentrated solutions which can be more readily handled and distributed.

It will accordingly be noted that, according to the present invention, we substitute for the ordinary haphazard composition of water derived from the usual local supply and varying in composition as to the salts in solution therein, a water wherein the salts in solution are definitely ascertained and determined, and particularly wherein the salts present serve as a yeast food or stimulant and likewise aid in the maturing and leavening of the dough batch within the period of time required for the leavening thereof.

It will, of course, be understood that instead of distilled water, we may use suitable water derived from any other adequately pure source; in which event, it will be desirable to first analyze the water so as to make allowance for any ammonium chlorid, calcium chlorid or potassium bromate that it may contain. Indeed, provided that the water is from a source which will permit it to take or maintain in solution the relative proportions of ammonium chlorid, calcium chlorid, and potassium bromate specified, the presence or absence of the salts usually found in solution in waters employed in bread-making will not be objectionable by their presence, in so far as the yeast-stimulating and dough-ripening effect of our improved mineral water is concerned.

What we claim is:

A mineral water for use as a yeast stimulant and dough ripener in the production of leavened bread, comprising water having in solution ammonium chlorid, calcium chlorid, and potassium bromate; substantially as described.

In testimony whereof we affix our signatures.

HENRY A. KOHMAN.
CHARLES HOFFMAN.
TRUMAN M. GODFREY.